(12) United States Patent
Sharma et al.

(10) Patent No.: US 11,025,431 B2
(45) Date of Patent: Jun. 1, 2021

(54) METHOD AND SYSTEM FOR TWO FACTOR AUTHENTICATION FOR BLOCKCHAIN TRANSACTIONS

(71) Applicant: MASTERCARD INTERNATIONAL INCORPORATED, Purchase, NY (US)

(72) Inventors: Madhavi Sharma, Haryana (IN); Jaipal Singh Kumawat, Rajasthan (IN); Chandan Garg, Punjab (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 342 days.

(21) Appl. No.: 16/236,718

(22) Filed: Dec. 31, 2018

(65) Prior Publication Data

US 2020/0213128 A1    Jul. 2, 2020

(51) Int. Cl.
*H04L 9/32* (2006.01)
*H04L 9/30* (2006.01)
*H04L 9/06* (2006.01)
*H04W 12/06* (2021.01)

(52) U.S. Cl.
CPC .......... *H04L 9/3247* (2013.01); *H04L 9/0643* (2013.01); *H04L 9/30* (2013.01); *H04L 9/3226* (2013.01); *H04L 9/3297* (2013.01); *H04W 12/06* (2013.01); *H04L 2209/38* (2013.01); *H04L 2209/56* (2013.01); *H04L 2209/80* (2013.01); *H04L 2463/082* (2013.01)

(58) Field of Classification Search
CPC ....... H04L 9/3247; H04L 9/3226; H04L 9/30; H04L 9/0643; H04L 9/3297; H04L 9/3239; H04L 2209/80; H04L 2209/38; H04L 2209/56; H04L 2463/082; H04L 63/0823; H04W 12/06
See application file for complete search history.

(56) References Cited

U.S. PATENT DOCUMENTS

| | | | |
|---|---|---|---|
| 2019/0190719 A1* | 6/2019 | van de Ruit | G06F 21/64 |
| 2020/0134656 A1* | 4/2020 | Padmanabhan | H04L 63/0815 |
| 2020/0322132 A1* | 10/2020 | Covaci | H04L 9/3247 |

* cited by examiner

*Primary Examiner* — Nelson S. Giddins
(74) *Attorney, Agent, or Firm* — Buchanan Ingersoll & Rooney PC

(57) ABSTRACT

A method for two factor authentication for a blockchain transaction includes: storing a data pair including a public key of a first cryptographic key pair and an expected data value; receiving a transaction request including a first digital signature, one or more input addresses, one or more output addresses, and at least one transaction amount; identifying a processed transaction in a sidechain including a destination address and a transaction data value, wherein the destination address is generated using the public key of the first cryptographic key pair; performing a first authentication by validating the first digital signature using the public key of the first cryptographic key pair; performing a second authentication by validating the transaction data value using the expected data value; and transmitting the received transaction request to a plurality of other nodes in a blockchain network.

16 Claims, 5 Drawing Sheets

METHOD AND SYSTEM FOR TWO FACTOR AUTHENTICATION FOR BLOCKCHAIN TRANSACTIONS

FIELD

The present disclosure relates to two factor authentication for blockchain transactions, specifically the use of a specified blockchain wallet on a sidechain to serve as a second factor of authentication for a transaction processed on a main blockchain.

BACKGROUND

Blockchains were initially created for the use of cryptographic currency, also referred to as cryptocurrency, where a decentralized and anonymous system could be used for parties to transact with one another. One of the benefits of blockchain is the anonymous and indiscriminate nature of the transaction processing: one must simply present the proper private key (more particularly a valid digital signature generated therefrom) and the transaction will be processed. While reliance on a simple private key to conduct transactions has these benefits, it is not without risks. If someone loses their private key, or their private key gets copied or otherwise compromised, they are at risk of losing all of the funds tied to that key without any recourse or ability for recovery.

In the financial industry, many banks often seek methods for increasing account security of their customers and preventing fraud, particularly in cases where a nefarious actor is attempting to transact as their customer. One of the most common methods for basic account protection in the financial industry is the use of two factor authentication: the customer must authentication themselves using two separate methods before a transaction can successfully process. Most commonly, the two factors are the use of a personal identification number and the entry of a one-time password or other code received on a registered computing device. Two factor authentication has proved to be a useful method for providing greater account security without negatively impacting the customer experience.

Two factor authentication could therefore serve as a suitable method of increasing the account security of a user of a blockchain wallet. However, there are currently no methods for implementing two factor authentication in a blockchain. The decentralized nature of a blockchain provides an impediment for implementing two factor authentication, as there is no management authority to administer or register users and devices or to deliver one-time passwords or otherwise manage a second authentication factor. In addition, two factor authentication typically relies on verifying that a user is who they purport to be, which often involves verifying the identity of the user in some manner. As blockchains are typically preferred by users for the anonymity, authentication factors that rely on user identification may be detrimental to a blockchain's user base and is thus unsuitable for implementation.

Thus, there is a need for a technological solution to enable two factor authentication to be used for blockchain transactions in a manner that maintains the decentralization and anonymity that currently exists for blockchains.

SUMMARY

The present disclosure provides a description of systems and methods for two factor authentication in a blockchain transaction. A standard blockchain transaction authenticates the user transferring funds through the use of a digital signature, generated using a private key that represents the user's blockchain wallet. To implement a second factor of authentication, a sidechain is used. A secondary blockchain wallet that uses the sidechain is registered by the user with the primary blockchain. Before a new blockchain transaction takes place, the user must perform an action on the sidechain using the secondary blockchain wallet, such as by posting a digital token, unique value, or an address of the primary blockchain wallet. This expected data value is also available to the nodes in the primary blockchain, either provided by the user before a transaction or generated by the nodes themselves. When the primary blockchain transaction is submitted to the blockchain, the nodes authenticate it as normal (e.g., using the digital signature), but also check the sidechain for posting of the expected data value to the secondary blockchain wallet that is paired with the primary blockchain wallet as the second factor. A transaction cannot be successfully confirmed, and thereby processed, without this second factor. The result is two factor authentication in a blockchain transaction that does not rely on any centralization or use of any additional entities, and does not compromise the anonymity of the users involved in the blockchain transaction.

A method for two factor authentication for a blockchain transaction includes: storing, in a memory of a blockchain node, a data pair including at least a public key of a first cryptographic key pair and an expected data value; receiving, by a receiver of the blockchain node, a transaction request, wherein the transaction request includes at least a first digital signature, one or more input addresses, one or more output addresses, and at least one transaction amount; identifying, by a processing device of the blockchain node, a processed transaction in a sidechain including at least a destination address and a transaction data value, wherein the destination address is generated using the public key of the first cryptographic key pair; performing, by the processing device of the blockchain node, a first authentication, wherein the first authentication includes at least validating the first digital signature using the public key of the first cryptographic key pair; performing, by the processing device of the blockchain node, a second authentication, wherein the second authentication includes at least validating the transaction data value using the expected data value; and transmitting, by a transmitter of the blockchain node, the received transaction request to a plurality of other nodes in a blockchain network that includes the blockchain node.

A system for two factor authentication for a blockchain transaction includes: a memory of a blockchain node configured to store a data pair including at least a public key of a first cryptographic key pair and an expected data value; a receiver of the blockchain node configured to receive a transaction request, wherein the transaction request includes at least a first digital signature, one or more input addresses, one or more output addresses, and at least one transaction amount; a processing device of the blockchain node configured to identify a processed transaction in a sidechain including at least a destination address and a transaction data value, wherein the destination address is generated using the public key of the first cryptographic key pair, perform a first authentication, wherein the first authentication includes at least validating the first digital signature using the public key of the first cryptographic key pair, and perform a second authentication, wherein the second authentication includes at least validating the transaction data value using the expected data value; and a transmitter of the blockchain node configured to transmit the received transaction request to a plurality of other nodes in a blockchain network that includes the blockchain node.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Blockchain—A public ledger of all transactions of a blockchain-based currency. One or more computing devices may comprise a blockchain network, which may be configured to process and record transactions as part of a block in the blockchain. Once a block is completed, the block is added to the blockchain and the transaction record thereby updated. In many instances, the blockchain may be a ledger of transactions in chronological order, or may be presented in any other order that may be suitable for use by the blockchain network. In some configurations, transactions recorded in the blockchain may include a destination address and a currency amount, such that the blockchain records how much currency is attributable to a specific address. In some instances, the transactions are financial and others not financial, or might include additional or different information, such as a source address, timestamp, etc. In some embodiments, a blockchain may also or alternatively include nearly any type of data as a form of transaction that is or needs to be placed in a distributed database that maintains a continuously growing list of data records hardened against tampering and revision, even by its operators, and may be confirmed and validated by the blockchain network through proof of work and/or any other suitable verification techniques associated therewith. In some cases, data regarding a given transaction may further include additional data that is not directly part of the transaction appended to transaction data. In some instances, the inclusion of such data in a blockchain may constitute a transaction. In such instances, a blockchain may not be directly associated with a specific digital, virtual, fiat, or other type of currency.

System for Two Factor Authentication for Blockchain Transactions

Figure 1:
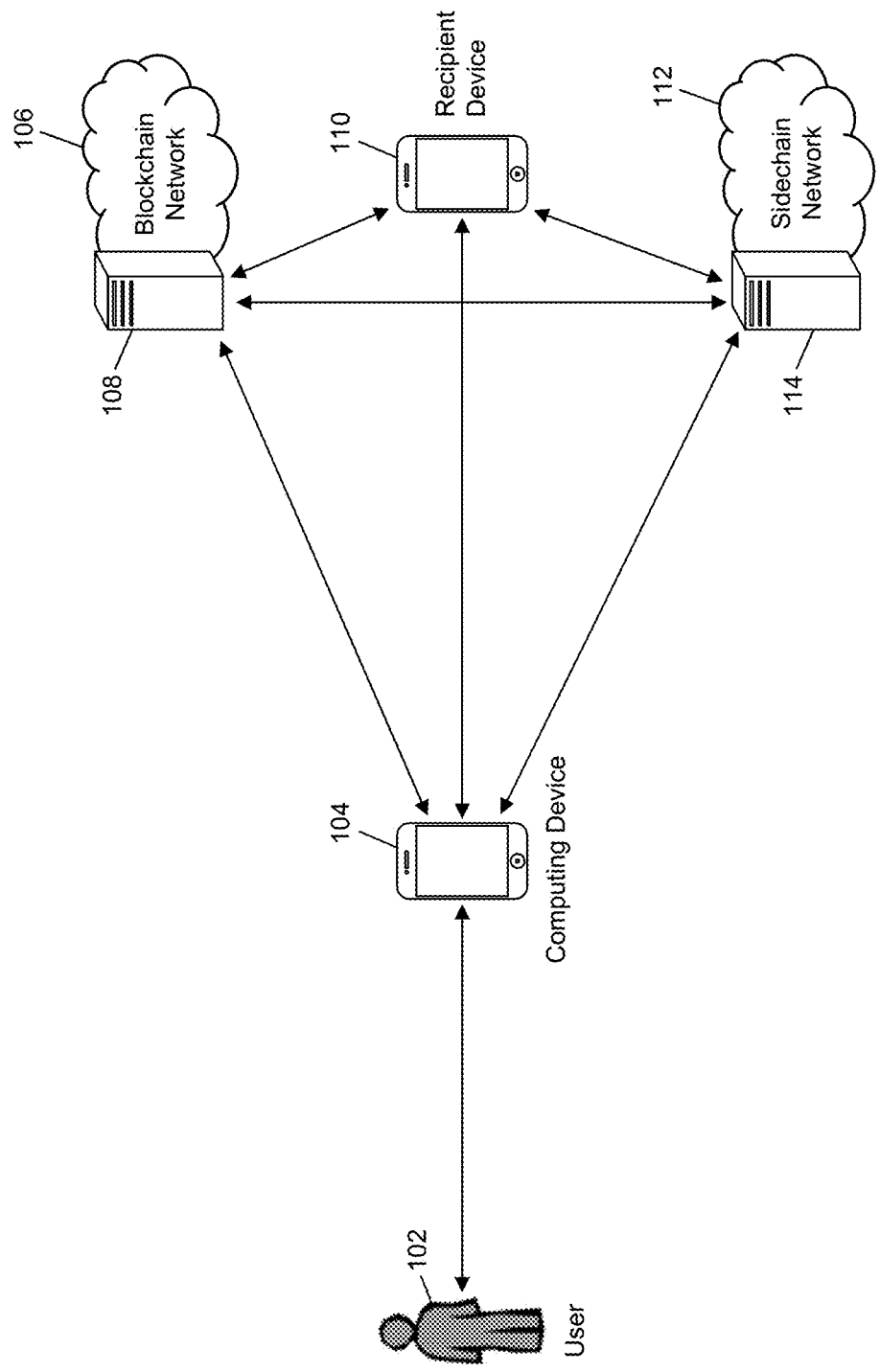
FIG. 1 is a block diagram illustrating a high level system architecture for hybrid payment authorizations in accordance with exemplary embodiments.

FIG. 1 illustrates a system 100 for the implementation of two factor authentication for blockchain transactions through the use of a sidechain for increasing account security while maintaining anonymity and decentralization.

In the system 100, a user 102 may be a participant in a blockchain that is associated with a blockchain network 106. The user 102 may participate in the blockchain via the use of a blockchain wallet that is stored in or otherwise managed by a computing device 104 of the user 102. The blockchain wallet may be associated with the blockchain network 106 that is used to transmit and receive blockchain currency in electronic payment transactions conducted via the blockchain network 106. A blockchain wallet may be an application program that is executed by the computing device 104 possessed by the user 102. A blockchain wallet may include a private key of a cryptographic key pair that is used to generate digital signatures that serve as authorization by the user 102 for a blockchain transaction, where the digital signature can be verified by the blockchain network 106 using the public key of the cryptographic key pair. Verification of the digital signature may serve as the first authentication factor in the methods discussed herein. In some cases, the term "blockchain wallet" may refer specifically to the private key. In some embodiments, a third party entity, such as a key repository, may store the consumer's private key. In other embodiments, the private key may be stored on the computing device 104. The computing device 104 may be any type of device suitable for performing the functions discussed herein, such as a desktop computer, laptop computer, tablet computer, notebook computer, cellular phone, smart phone, smart watch, smart television, wearable computing device, implantable computing device, etc.

The blockchain network 106 may be comprised of a plurality of blockchain nodes 108. Each blockchain node 108 may be a computing system that is configured to perform functions related to the processing and management of the blockchain, including the generation of blockchain data values, verification of proposed blockchain transactions, verification of digital signatures, generation of new blocks, validation of new blocks, and maintenance of a copy of the blockchain. The blockchain may be a distributed ledger that is comprised of at least a plurality of blocks. Each block may include at least a block header and one or more data values. Each block header may include at least a timestamp, a block reference value, and a data reference value. The timestamp may be a time at which the block header was generated, and may be represented using any suitable method (e.g., UNIX timestamp, DateTime, etc.). The block reference value may be a value that references an earlier block (e.g., based on timestamp) in the blockchain. In some embodiments, a block reference value in a block header may be a reference to the block header of the most recently added block prior to the respective block. In an exemplary embodiment, the block reference value may be a hash value generated via the hashing of the block header of the most recently added block. The data reference value may similarly be a reference to the one or more data values stored in the block that includes the block header. In an exemplary embodiment, the data reference value may be a hash value generated via the hashing of the one or more data values. For instance, the block reference value may be the root of a Merkle tree generated using the one or more data values.

The use of the block reference value and data reference value in each block header may result in the blockchain being immutable. Any attempted modification to a data value would require the generation of a new data reference value for that block, which would thereby require the subsequent block's block reference value to be newly generated, further requiring the generation of a new block reference value in every subsequent block. This would have to be performed and updated in every single blockchain node 108 in the blockchain network 106 prior to the generation and addition of a new block to the blockchain in order for the change to be made permanent. Computational and communication limitations may make such a modification exceedingly difficult, if not impossible, thus rendering the blockchain immutable.

Each blockchain data value may correspond to a blockchain transaction. A blockchain transaction may consist of at least: a digital signature of the sender of currency (e.g., the user 102) that is generated using the sender's private key, a blockchain address of the recipient of currency (e.g., another use, represented in FIG. 1 by the recipient device 110) generated using the recipient's public key, and a blockchain currency amount that is transferred. In some blockchain transactions, the transaction may also include one or more blockchain addresses of the sender where blockchain currency is currently stored (e.g., where the digital signature proves their access to such currency), as well as an address generated using the sender's public key for any change that is to be retained by the sender. In some cases, a blockchain transaction may also include the sender's public key, for use by any entity in validating the transaction. For the processing of a blockchain transaction, such data may be provided to a blockchain node 108 in the blockchain network 106, either by the sender (e.g., via the computing device 104) or the recipient (e.g., via the recipient device 110). The blockchain node 108 may verify the digital signature and the sender's access to the funds, and, traditionally, then include the blockchain transaction in a new block. The new block may be validated by other blockchain nodes 108 in the blockchain network 106 before being added to the blockchain and distributed to all of the blockchain nodes 108 in the blockchain network 106.

In a standard blockchain transaction, the user 102 may thus generate a digital signature using the computing device 104 using the private key thereof. The recipient may generate a blockchain address using its public key (e.g., in the recipient device 110), which may be provided to the computing device 104. In some cases, the recipient may provide (e.g., via the recipient device 110) the computing device 104 with its public key, where the computing device 104 may generate the blockchain address. The computing device 104 may then submit the required information to a blockchain node 108 in the blockchain network 106 for processing. In some instances, the blockchain node 108 may return a blockchain transaction identifier to the computing device 104, which may be a value that is unique to that blockchain transaction for identification thereof. In such traditional transactions, the recipient may be required to generate (e.g., via the recipient device 110) blockchain address or distribute its public key, and, in some cases, may be required to submit the blockchain transaction data directly to blockchain networks 106. The recipient device 110 may be any computing device specifically configured to perform the functions discussed herein, such as the same as the computing device 104.

The system 100 may introduce a second factor of authentication that is to be used by blockchain nodes 108 before a blockchain transaction can be verified and added into a new block that is verified and added to the blockchain. The system 100 may include a sidechain network 112 that operates a sidechain. A sidechain may be a blockchain that is secondary to the primary blockchain associated with the blockchain network 106. Transactions and other data may be posted to the sidechain by sidechain nodes 114 that comprise the sidechain network 112, which may be completely separate from the primary blockchain or may be attached to the primary blockchain using a two-way peg or other suitable mechanism. In some cases, data posted to the sidechain may directly refer to blockchain wallets on the primary blockchain (e.g., through blockchain addresses generated using public keys thereof), and, in some instances, may do so without the transfer of any assets or currency to the blockchain wallet. As discussed herein, blockchain wallets on the sidechain may be referred to as "sidechain wallets." As also discussed herein, "blockchain" may refer to the primary blockchain associated with the blockchain network 106, while "sidechain" may be used to refer to the secondary blockchain associated with the sidechain network 112.

When the user 102 wishes to conduct a transaction on the blockchain, the user 102 must first process a new transaction or entry in the sidechain using their sidechain wallet, which may also be stored in the computing device 104. The entry posted to the sidechain, referred to herein as a sidechain data value, may include at least a destination address that is generated using the user's blockchain wallet (e.g., the public key thereof) as well as an expected data value. The expected data value may be a digital token, password, data file, hash value, or any other value. For instance, in one example the user 102 may provide its own, custom expected data value through the computing device 104. In another example, the computing device 104 may generate a digital token, which may be a random or pseudo-random alphanumeric value. In yet another example, the user 102 may request, through the computing device 104, a digital token from a blockchain node 108 for use. The expected data value may be provided to a sidechain node 114 in the sidechain network 112 along with the destination address and a digital signature generated using the sidechain wallet in the computing device 104. The sidechain node 114 may validate the digital signature using the public key of the sidechain wallet and verify and add the sidechain data value to a new block in the sidechain, using standard methods and systems. The sidechain node 114 may thus include a new sidechain data entry that includes the expected data value and a destination address that is directly tied to the user's blockchain wallet (e.g., being generated by its public key).

The user 102 may then initiate the blockchain transaction by submitting their digital signature generated using their blockchain wallet, a transaction amount, and one or more input and output addresses (e.g., where at least one output address is generated using the public key of the recipient device 110 for receipt of the transaction amount) to a blockchain node 108 in the blockchain network 106. The blockchain node 108 may verify the digital signature using the user's blockchain wallet's public key as the first factor of authentication. The user 102 may also submit, with the blockchain transaction data, the expected data value to the blockchain node 108. In instances where the blockchain node 108 provided the expected data value to the user 102, the user 102 may not be required to include the expected data value in the submission of the new blockchain transaction.

For the second authentication factor, the blockchain node 108 may examine the sidechain to identify the most recent sidechain data value that includes a destination address generated using the user's blockchain wallet. In some embodiments, the user 102 may receive a sidechain transaction identifier from the sidechain node 114 when the sidechain data value is posted, which may be provided to the blockchain node 108 to expedite the identification process. Once the sidechain data value is identified, the blockchain node 108 may identify the expected data value included therein. The blockchain node 108 may then check the expected data value found in the sidechain data value against the expected data value received from the user 102 (e.g., or provided thereto by the blockchain node 108, as applicable). This check of the expected data value may be the second authentication factor, where, if the expected data values do not match, the blockchain transaction may not be processed. If the expected data values do match, and the first authentication factor is successful, then the blockchain transaction may be processed using standard methods and systems. The user 102 may thus successfully transaction on the blockchain using two factor authentication, where the second factor relies on the use of a sidechain without compromising the user's anonymity or the decentralized nature of the blockchain.

In some embodiments, the user 102 may be required to pre-register their sidechain wallet with the blockchain network 106. In such embodiments, the user 102 may provide information regarding their sidechain wallet, such as a public key thereof, to a blockchain node 108 before initiating any transactions using two factor authentication. The blockchain nodes 108 may store a data pair associating the sidechain wallet information with the blockchain wallet, for use in identifying sidechain data values and performing the second factor authentication. In some embodiments, the expected data value in the sidechain data value may be a digital signature generated using the user's sidechain wallet, where checking of the expected data value may include verifying this digital signature using the user's registered sidechain public key. In some cases, the data pair may be stored in the blockchain itself. For instance, a blockchain transaction may be posted (e.g., with a zero or trivial currency amount) to the blockchain that uses the sidechain wallet information as the output address or otherwise includes the sidechain wallet information in the blockchain transaction data, such as in a smart contract.

In some embodiments, the blockchain nodes 108 may manage use of the sidechain for the second authentication factor on behalf of the user 102. In such embodiments, when a blockchain transaction involving the user 102 is successful, a blockchain node 108 may generate the new expected data value (e.g., digital token or other value) for use in the next blockchain transaction of the user 102. The blockchain node 108 may transmit the new expected data value to a sidechain node 114. In some cases, the blockchain node 108 may provide an address using the user's sidechain wallet (e.g., the pre-registered public key thereof) that may be provided to the sidechain node 114 as well as a destination address using the user's blockchain wallet's public key. The sidechain node 114 may enter a new sidechain data value that includes this new expected data value, which may be used in a subsequent blockchain transaction. In some instances, the user 102 may still be required to submit a digital signature using the sidechain wallet before the sidechain data value can be confirmed and included in a new block that is added to the sidechain. In some embodiments, a smart contract may be used by to generate and provide the new expected data value back to the computing device 104 or directly to the sidechain node 114, where the smart contract executes open successful processing of the initial blockchain transaction.

The methods and systems discussed herein culminate in an improved blockchain network 106 where two factor authentication can be successfully used without compromising decentralization or user anonymity via the use of a sidechain. In some cases, interaction with the sidechain and use of expected data values can be managed completely by a blockchain wallet in the user's computing device 104, enabling the second authentication factor to be used without requiring any additional input or actions performed by the user 102. In such cases, the user 102 may be protected against theft of their blockchain wallet's private key by behaving as normal due to the improvements made to the blockchain nodes 108 and user blockchain wallet discussed herein.

Blockchain Node

Figure 2:
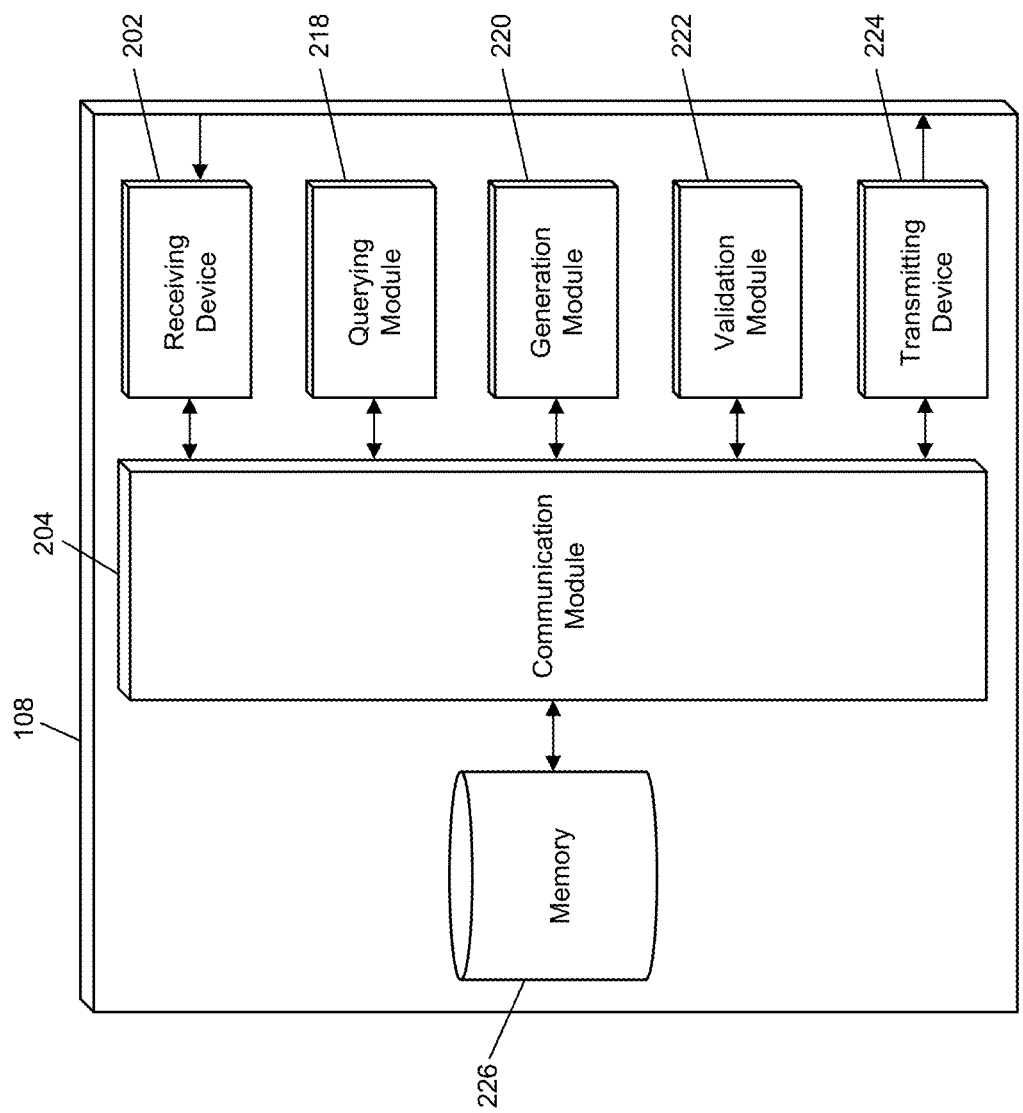
FIG. 2 is a block diagram illustrating the processing server of the system of FIG. 1 for hybrid payment authorization in accordance with exemplary embodiments.

FIG. 2 illustrates an embodiment of a blockchain node 108 in the system 100. It will be apparent to persons having skill in the relevant art that the embodiment of the blockchain node 108 illustrated in FIG. 2 is provided as illustration only and may not be exhaustive to all possible configurations of the blockchain node 108 suitable for performing the functions as discussed herein. For example, the computer system 500 illustrated in FIG. 5 and discussed in more detail below may be a suitable configuration of the blockchain node 108.

The blockchain node 108 may include a receiving device 202. The receiving device 202 may be configured to receive data over one or more networks via one or more network protocols. In some instances, the receiving device 202 may be configured to receive data from computing devices 104, recipient devices 110, sidechain nodes 114, and other systems and entities via one or more communication methods, such as radio frequency, local area networks, wireless area networks, cellular communication networks, Bluetooth, the Internet, etc. In some embodiments, the receiving device 202 may be comprised of multiple devices, such as different receiving devices for receiving data over different networks, such as a first receiving device for receiving data over a local area network and a second receiving device for receiving data via the Internet. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by computing devices 104 or recipient devices 110 that may be superimposed or otherwise encoded with pre-registration data, requests for expected data values, or transaction requests, which may include input and output addresses, digital signatures, transaction amounts, public keys, etc. The receiving device 202 may also be configured to receive data signals electronically transmitted by sidechain nodes 114 in the sidechain network 112 that may be superimposed or otherwise encoded with sidechain data, including blocks in the sidechain and/or sidechain data values included therein.

The blockchain node 108 may also include a communication module 204. The communication module 204 may be configured to transmit data between modules, engines, databases, memories, and other components of the blockchain node 108 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the blockchain node 108 and external components of the blockchain node 108, such as externally connected databases, display devices, input devices, etc. The blockchain node 108 may also include a processing device. The processing device may be configured to perform the functions of the blockchain node 108 discussed herein as will be apparent to persons having skill in the relevant art. In some embodiments, the processing device may include and/or be comprised of a plurality of engines and/or modules specially configured to perform one or more functions of the processing device, such as a querying module 218, generation module 220, validation module 222, etc. As used herein, the term "module" may be software or hardware particularly programmed to receive an input, perform one or more processes using the input, and provides an output. The input, output, and processes performed by various modules will be apparent to one skilled in the art based upon the present disclosure.

The blockchain node 108 may include a querying module 218. The querying module 218 may be configured to execute queries on databases to identify information. The querying module 218 may receive one or more data values or query strings, and may execute a query string based thereon on an indicated database, such as a memory 226, to identify information stored therein. The querying module 218 may then output the identified information to an appropriate engine or module of the blockchain node 108 as necessary. The querying module 218 may, for example, execute a query on the memory 226 to identify a prior block in the blockchain when generating a new block header, or to identify a new expected data value, or a pre-registered blockchain-sidechain wallet pair.

The blockchain node 108 may also include a generation module 220. The generation module 220 may be configured to generate data for use by the blockchain node 108 in performing the functions discussed herein. The generation module 220 may receive instructions as input, may generate data based on the instructions, and may output the generated data to one or more modules of the blockchain node 108. For example, the generation module 220 may be configured to generate notifications and other data messages for transmission to computing devices 104, such as prompts for digital signatures, registration data, blockchain transaction identifiers, authentication factor messages, etc. The generation module 220 may also be configured to block headers and new blocks, which may include the hashing of data values as discussed above. In some cases, the generation module 220 may be configured to generate new expected data values and/or blockchain or sidechain addresses using public keys.

The blockchain node 108 may also include a validation module 222. The validation module 222 may be configured to validate data as part of the functions of the blockchain node 108 as discussed herein. The validation module 222 may receive data to be validated as input, may attempt to validate the data, and may output a result of the attempted validation to another module or engine of the blockchain node 108. In some cases, the input may include data to be used by the validation module 222. In some instances, the validation module 222 may be configured to identify data to be used in the validation, such as by issuing instructions to the querying module 218. The validation module 222 may, for example, be configured to validate digital signatures using public keys, validate received expected data values by checking them against transaction data values in sidechain data values, etc.

The blockchain node 108 may also include a transmitting device 224. The transmitting device 224 may be configured to transmit data over one or more networks via one or more network protocols. In some instances, the transmitting device 224 may be configured to transmit data to computing devices 104, recipient devices 110, sidechain nodes 114, and other entities via one or more communication methods, local area networks, wireless area networks, cellular communication, Bluetooth, radio frequency, the Internet, etc. In some embodiments, the transmitting device 224 may be comprised of multiple devices, such as different transmitting devices for transmitting data over different networks, such as a first transmitting device for transmitting data over a local area network and a second transmitting device for transmitting data via the Internet. The transmitting device 224 may electronically transmit data signals that have data superimposed that may be parsed by a receiving computing device. In some instances, the transmitting device 224 may include one or more modules for superimposing, encoding, or otherwise formatting data into data signals suitable for transmission.

The transmitting device 224 may be configured to electronically transmit data signals to computing devices 104 and recipient devices 110 that are superimposed or otherwise encoded with requests for digital signatures, expected data values, public keys, addresses, etc. The transmitting device 224 may also be configured to electronically transmit data signals to sidechain nodes 114, which may be superimposed or otherwise encoded with new expected data values, requests for blocks or sidechain data values included therein, etc.

The blockchain node 108 may also include a memory 226. The memory 226 may be configured to store data for use by the blockchain node 108 in performing the functions discussed herein, such as public and private keys, symmetric keys, etc. The memory 226 may be configured to store data using suitable data formatting methods and schema and may be any suitable type of memory, such as read-only memory, random access memory, etc. The memory 226 may include, for example, encryption keys and algorithms, communication protocols and standards, data formatting standards and protocols, program code for modules and application programs of the processing device, and other data that may be suitable for use by the blockchain node 108 in the performance of the functions disclosed herein as will be apparent to persons having skill in the relevant art. In some embodiments, the memory 226 may be comprised of or may otherwise include a relational database that utilizes structured query language for the storage, identification, modifying, updating, accessing, etc. of structured data sets stored therein. The memory 226 may be configured to store, for example, blockchain data, hashing algorithms for generating block headers and blocks, credentials for validation, usage rule templates, communication data for other blockchain nodes 108, communication data for computing devices 104, communication data for sidechain nodes 114, formatting standards, expected data value generation rules, pre-registered blockchain-sidechain data pairs, etc.

Processing a Blockchain Transaction with Two Factor Authentication

Figure 3:
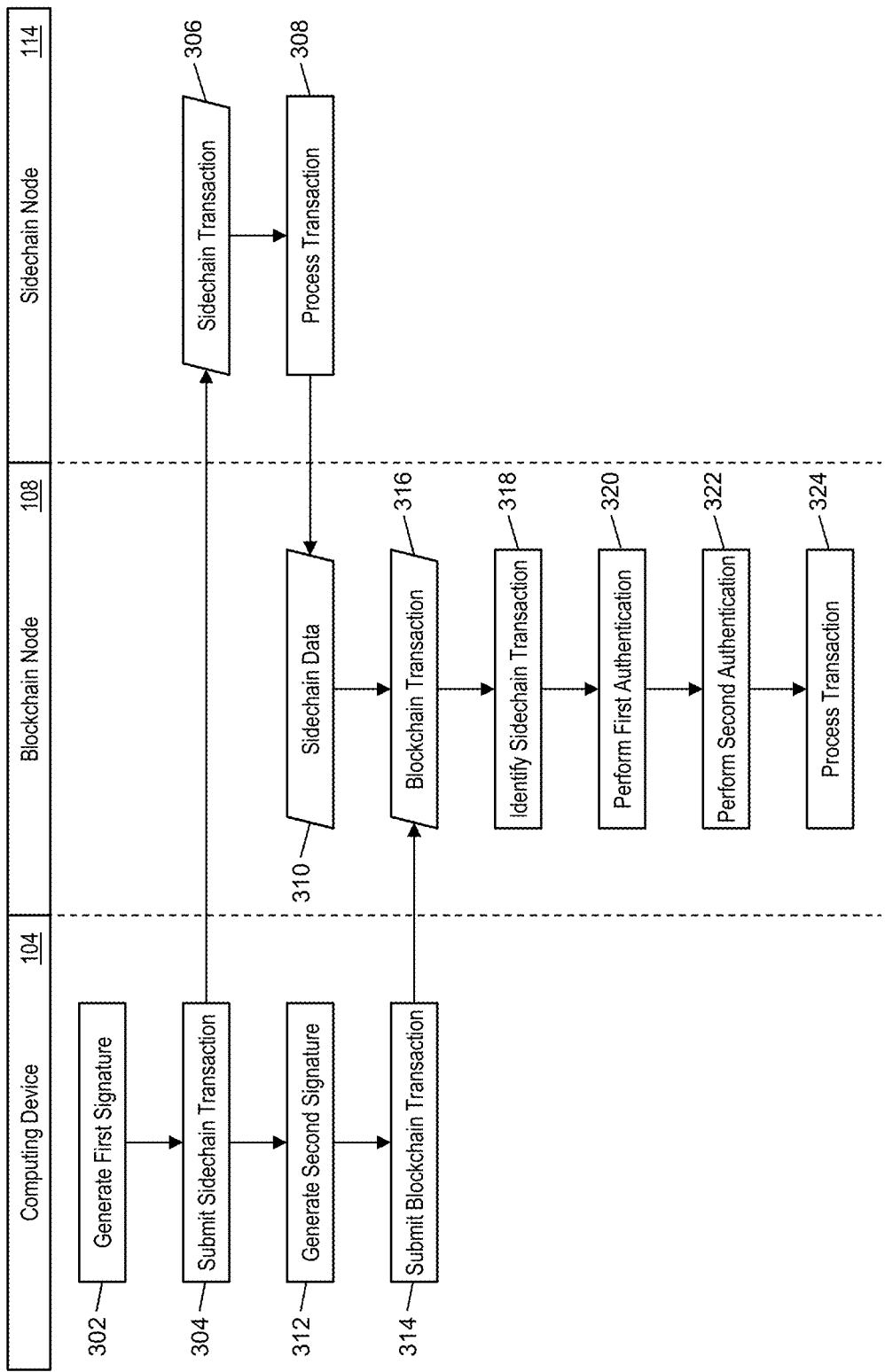
FIG. 3 is a flow diagram illustrating a process hybrid authorization of a payment transaction by the processing server of FIG. 2 in accordance with exemplary embodiments.

FIG. 3 illustrates an example process for the processing of a blockchain transaction in the system 100 that utilizes two factor authentication via the use of a sidechain in addition to the blockchain.

In step 302, the computing device 104 may generate a first digital signature using the private key of its sidechain wallet using a suitable signature generation algorithm. In step 304, the computing device 104 may electronically transmit transaction data for a sidechain transaction to a sidechain node 114 in the sidechain network 112 using a suitable communication network and method. The transaction data for the sidechain transaction may include at least the first digital signature, an expected data value, and a recipient address generated using the public key of the user's blockchain wallet. In some cases, steps 302 or 304 may include generation of the expected data value, such as in cases where the expected data value is a digital signature or other generated data.

In step 306, the sidechain node 114 may receive the sidechain transaction data. In step 308, the sidechain transaction may be processed. Processing of the sidechain transaction may include verification of the first digital signature using a public key of the user's sidechain wallet, the generation of a new sidechain data value that includes the transaction data, and the inclusion of the new sidechain data value in a newly generated block that is verified and added to the sidechain. In some embodiments, processing of the sidechain transaction may include transmitting a sidechain transaction identifier for the sidechain data value back to the computing device 104 using a suitable communication network and method. In step 310, the receiving device 202 of the blockchain node 108 may receive the new sidechain data value as part of the updating of the sidechain. In some cases, sidechain nodes 114 may actively push updated sidechain blocks to the blockchain node 108. In other cases, the blockchain node 108 may monitor the sidechain for updates and pull new blocks once they are added. The querying module 218 of the blockchain node 108 may execute a query on the memory 226 of the blockchain node 108 for storage of the sidechain data therein.

In step 312, the computing device 104 may generate a second digital signature using the private key of its blockchain wallet using a suitable signature generation algorithm. In some cases, the same signature generation algorithm may be used to generate both the first and second digital signatures. In step 314, the computing device 104 may submit a blockchain transaction to the blockchain node 108 for processing. The blockchain transaction may include at least the second digital signature, one or more transaction amounts, one or more input addresses, one or more output addresses (e.g., including at least one address generated using the recipient device's public key). In cases where the computing device 104 is provided with a sidechain transaction identifier, the sidechain transaction identifier may be included in the blockchain transaction data. In some instances, the expected data value may also be included in the blockchain transaction data. In step 316, the receiving device 202 of the blockchain node 108 may receive the blockchain transaction data from the computing device 104 using a suitable communication network and method.

In step 318, the querying module 218 of the blockchain node 108 may execute a query on the memory 226 of the blockchain node 108 to identify the sidechain data value that was added to the sidechain in step 308, using the sidechain transaction identifier, if available, or through the destination address included in the sidechain data value generated using the public key of the blockchain wallet involved in the blockchain transaction. In step 320, a first authentication may be performed by the validation module 222 of the blockchain node 108, which may include validating the second digital signature using the blockchain wallet's public key (e.g., included in the transaction data or previously provided to the blockchain node 108) and the signature generation algorithm. In step 322, a second authentication may be performed by the validation module 222 of the blockchain node 108, which may include verifying that the expected data value known to the blockchain node 108 (e.g., included in the transaction data or previously identified or received) matches the expected data value included in the identified sidechain data value. In step 324, if both authentications are successful, the blockchain transaction may be processed and added to the blockchain, such as by generating a new blockchain data value to include the blockchain transaction data, generating a new block that includes the blockchain data value, and distributing the new block to other blockchain nodes 108 for verification and inclusion in the blockchain.

Exemplary Method for Two Factor Authentication for a Blockchain Transaction

Figure 4:
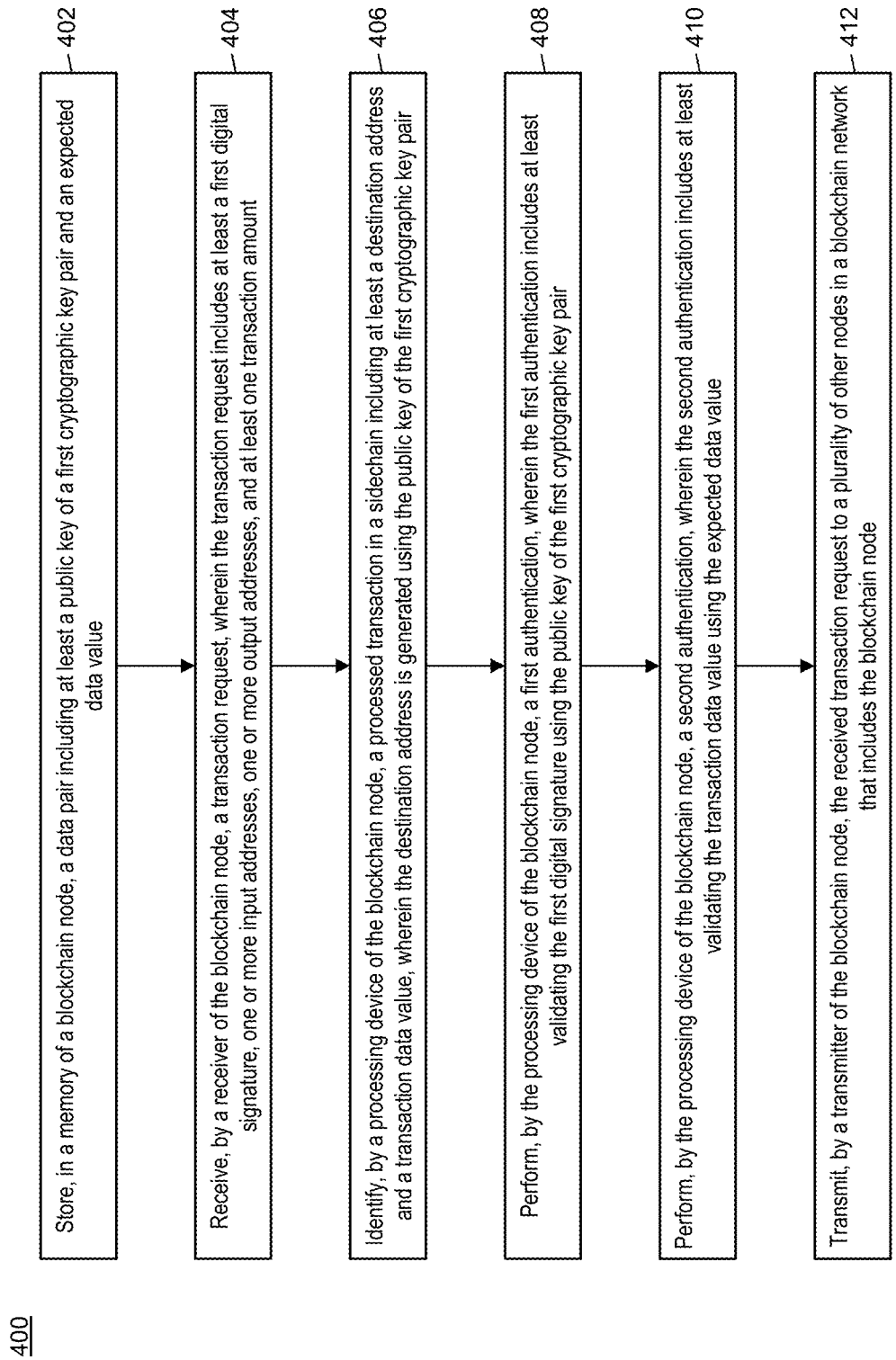
FIG. 4 is a flow chart illustrating an exemplary method for hybrid payment authorization in accordance with exemplary embodiments.

FIG. 4 illustrates a method 400 for the use of two factor authentication in a blockchain transaction without compromising user anonymity or blockchain decentralization.

In step 402, a data pair may be stored in a memory (e.g., the memory 226) of a blockchain node (e.g., the blockchain node 108) that includes at least a public key of a first cryptographic key pair and an expected data value. In step 404, a transaction request may be received by a receiver (e.g., the receiving device 202) of the blockchain node, wherein the transaction request includes at least a first digital signature, one or more input addresses, one or more output addresses, and at least one transaction amount. In step 406, a processed transaction may be identified by a processing device (e.g., the querying module 218) of the blockchain node in a sidechain that includes at least a destination address and a transaction data value, wherein the destination address is generated using the public key of the first cryptographic key pair.

In step 408, a first authentication may be performed by the processing device (e.g., the validation module 222) of the blockchain node, wherein the first authentication includes at least validating the first digital signature using the public key of the first cryptographic key pair. In step 410, a second authentication may be performed by the processing device (e.g., the validation module 222) of the blockchain node, wherein the second authentication includes at least validating the transaction data value using the expected data value. In step 412, the received transaction request may be transmitted, by a transmitter (e.g., the transmitting device 224) of the blockchain node to a plurality of other nodes in a blockchain network (e.g., the blockchain network 106) that includes the blockchain node.

In one embodiment, the method 400 may further include generating, by the processing device of the blockchain node, a new block comprised of a new block header and a plurality of transaction values, wherein at least one of the plurality of transaction values includes the transaction request, and transmitting the received transaction request includes transmitting the generated new block. In a further embodiment, the method 400 may even further include: storing, in the memory of the blockchain node, a blockchain comprised of a plurality of blocks, wherein each block is comprised of a block header and one or more transaction values; and generating, by the processing device of the blockchain node, the new block header, wherein the new block header includes at least a timestamp, a first hash value generated from the plurality of transaction values, and a second hash value generated from the block header in a most recent block of the plurality of blocks, wherein the new block header is generated before generating the new block.

In some embodiments, the expected data value may be a digital token, and validating the transaction data value using the expected data value may include checking the transaction data value as being the same digital token as the expected data value. In one embodiment, the expected data value may be a public key of a second cryptographic key pair, the transaction data value may be a second digital signature, and validating the transaction data value using the expected data value may include validating the second digital signature using the public key of the second cryptographic key pair. In some embodiments, the data pair may be stored in a smart contract included in a transaction value included in a blockchain associated with the blockchain network.

In one embodiment, the method 400 may also include: identifying, by the processing device of the blockchain node, a new data value; and transmitting, by the transmitter of the blockchain node, at least the new data value and a recipient address generated using a public key of a second cryptographic key pair to one or more nodes in a secondary network associated with the sidechain. In a further embodiment, the method 400 may further include replacing, by the processing device of the blockchain node, the expected data value in the data pair with the new data value.

Computer System Architecture

Figure 5:
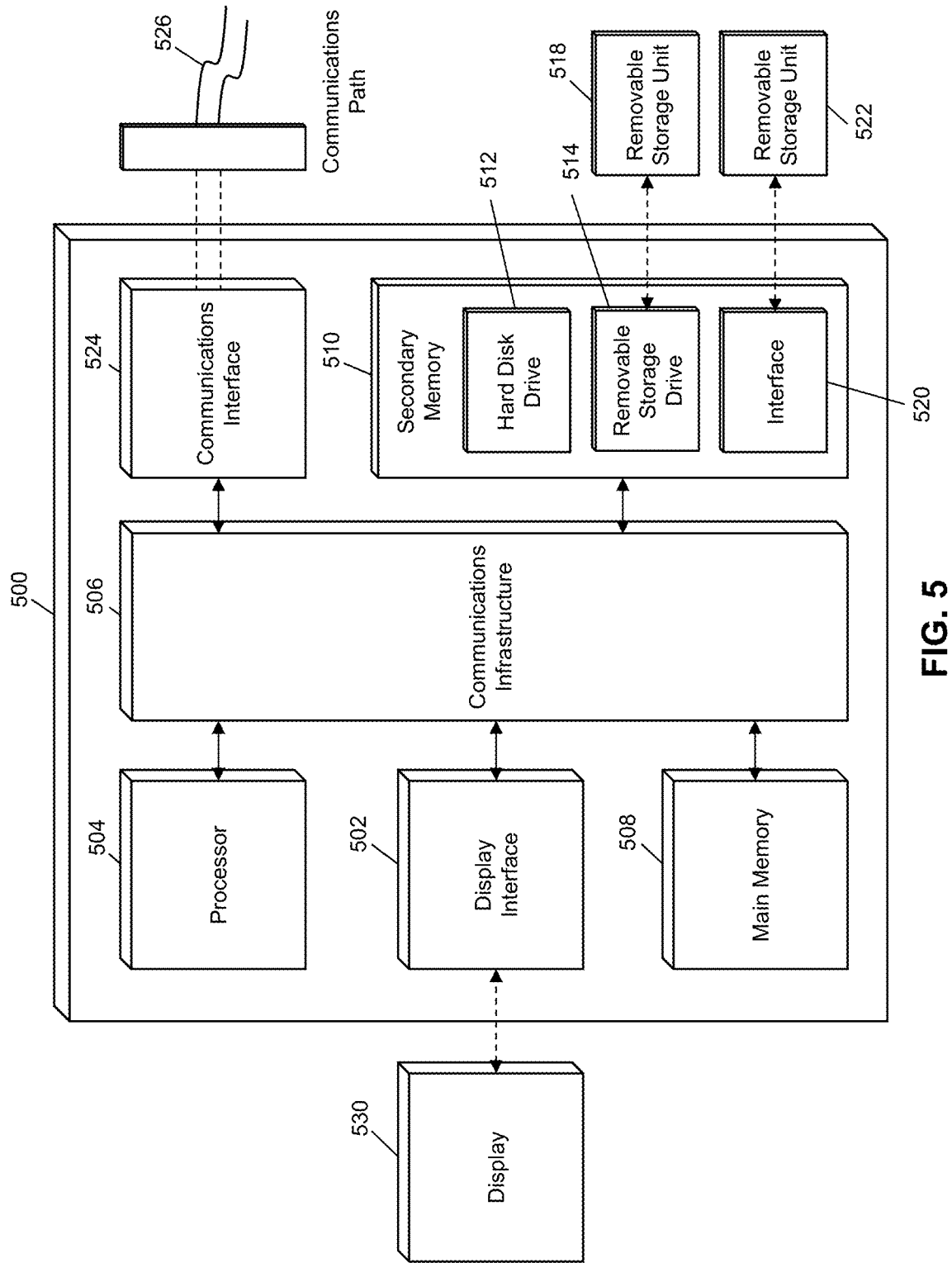
FIG. 5 is a block diagram illustrating a computer system architecture in accordance with exemplary embodiments.

FIG. 5 illustrates a computer system 500 in which embodiments of the present disclosure, or portions thereof, may be implemented as computer-readable code. For example, the processing server 102 of FIG. 1 may be implemented in specifically configured computer system 500 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3 and 4.

If programmable logic is used, such logic may execute on a commercially available processing platform configured by executable software code to become a specific purpose computer or a special purpose device (e.g., programmable logic array, application-specific integrated circuit, etc.). Embodiments of the disclosed subject matter can be practiced with various specifically configured computer system configurations, including multi-core multiprocessor systems, minicomputers, mainframe computers, computers linked or clustered with distributed functions so long as they have sufficient computing power.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 518, a removable storage unit 522, and a hard disk installed in hard disk drive 512.

Various embodiments of the present disclosure are described in terms of this example computer system 500. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

The processor device 504 may be connected to a communications infrastructure 506, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 500 may also include a main memory 508 (e.g., random access memory, read-only memory, etc.), and may also include a secondary memory 510. The secondary memory 510 may include the hard disk drive 512 and a removable storage drive 514, such as a floppy disk drive, a magnetic tape drive, an optical disk drive, a flash memory, etc.

The removable storage drive 514 may read from and/or write to the removable storage unit 518 in a well-known manner. The removable storage unit 518 may include a removable storage media that may be read by and written to by the removable storage drive 514. For example, if the removable storage drive 514 is a floppy disk drive or universal serial bus port, the removable storage unit 518 may be a floppy disk or portable flash drive, respectively. In one embodiment, the removable storage unit 518 may be non-transitory computer readable recording media.

In some embodiments, the secondary memory 510 may include alternative means for allowing computer programs or other instructions to be loaded into the computer system 500, for example, the removable storage unit 522 and an interface 520. Examples of such means may include a program cartridge and cartridge interface (e.g., as found in video game systems), a removable memory chip (e.g., EEPROM, PROM, etc.) and associated socket, and other removable storage units 522 and interfaces 520 as will be apparent to persons having skill in the relevant art.

Data stored in the computer system 500 (e.g., in the main memory 508 and/or the secondary memory 510) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 500 may also include a communications interface 524. The communications interface 524 may be configured to allow software and data to be transferred between the computer system 500 and external devices. Exemplary communications interfaces 524 may include a modem, a network interface (e.g., an Ethernet card), a communications port, a PCMCIA slot and card, etc. Software and data transferred via the communications interface 524 may be in the form of signals, which may be electronic, electromagnetic, optical, or other signals as will be apparent to persons having skill in the relevant art. The signals may travel via a communications path 526, which may be configured to carry the signals and may be implemented using wire, cable, fiber optics, a phone line, a cellular phone link, a radio frequency link, etc.

The computer system 500 may further include a display interface 502. The display interface 502 may be configured to allow data to be transferred between the computer system 500 and external display 530. Exemplary display interfaces 502 may include high-definition multimedia interface (HDMI), digital visual interface (DVI), video graphics array (VGA), etc. The display 530 may be any suitable type of display for displaying data transmitted via the display interface 502 of the computer system 500, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 508 and secondary memory 510, which may be memory semiconductors (e.g., DRAMs, etc.). These computer program products may be means for providing software to the computer system 500. Computer programs (e.g., computer control logic) may be stored in the main memory 508 and/or the secondary memory 510. Computer programs may also be received via the communications interface 524. Such computer programs, when executed, may enable computer system 500 to implement the present methods as discussed herein. In particular, the computer programs, when executed, may enable processor device 504 to implement the methods illustrated by FIGS. 3 and 4, as discussed herein. Accordingly, such computer programs may represent controllers of the computer system 500. Where the present disclosure is implemented using software, the software may be stored in a computer program product and loaded into the computer system 500 using the removable storage drive 514, interface 520, and hard disk drive 512, or communications interface 524.

The processor device 504 may comprise one or more modules or engines configured to perform the functions of the computer system 500. Each of the modules or engines may be implemented using hardware and, in some instances, may also utilize software, such as corresponding to program code and/or programs stored in the main memory 508 or secondary memory 510. In such instances, program code may be compiled by the processor device 504 (e.g., by a compiling module or engine) prior to execution by the hardware of the computer system 500. For example, the program code may be source code written in a programming language that is translated into a lower level language, such as assembly language or machine code, for execution by the processor device 504 and/or any additional hardware components of the computer system 500. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 500 to perform the functions disclosed herein. It will be apparent to persons having skill in the relevant art that such processes result in the computer system 500 being a specially configured computer system 500 uniquely programmed to perform the functions discussed above.

Techniques consistent with the present disclosure provide, among other features, systems and methods for two factor authentication for a blockchain transaction. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for two factor authentication for a blockchain transaction, comprising:
   storing, in a memory of a blockchain node, a data pair including at least a public key of a first cryptographic key pair and an expected data value;
   receiving, by a receiver of the blockchain node, a transaction request, wherein the transaction request includes at least a first digital signature, one or more input addresses, one or more output addresses, and at least one transaction amount;
   identifying, by a processing device of the blockchain node, a processed transaction in a sidechain including at least a destination address and a transaction data value, wherein the destination address is generated using the public key of the first cryptographic key pair;
   performing, by the processing device of the blockchain node, a first authentication, wherein the first authentication includes at least validating the first digital signature using the public key of the first cryptographic key pair;
   performing, by the processing device of the blockchain node, a second authentication, wherein the second authentication includes at least validating the transaction data value using the expected data value; and
   transmitting, by a transmitter of the blockchain node, the received transaction request to a plurality of other nodes in a blockchain network that includes the blockchain node.

2. The method of claim 1, further comprising:
   generating, by the processing device of the blockchain node, a new block comprised of a new block header and a plurality of transaction values, wherein
   at least one of the plurality of transaction values includes the transaction request, and
   transmitting the received transaction request includes transmitting the generated new block.

3. The method of claim 2, further comprising:
   storing, in the memory of the blockchain node, a blockchain comprised of a plurality of blocks, wherein each block is comprised of a block header and one or more transaction values; and
   generating, by the processing device of the blockchain node, the new block header, wherein the new block header includes at least a timestamp, a first hash value generated from the plurality of transaction values, and a second hash value generated from the block header in a most recent block of the plurality of blocks, wherein the new block header is generated before generating the new block.

4. The method of claim 1, wherein
   the expected data value is a digital token, and
   validating the transaction data value using the expected data value includes checking the transaction data value as being the same digital token as the expected data value.

5. The method of claim 1, wherein
the expected data value is a public key of a second cryptographic key pair,
the transaction data value is a second digital signature, and
validating the transaction data value using the expected data value includes validating the second digital signature using the public key of the second cryptographic key pair.

6. The method of claim 1, further comprising:
identifying, by the processing device of the blockchain node, a new data value; and
transmitting, by the transmitter of the blockchain node, at least the new data value and a recipient address generated using a public key of a second cryptographic key pair to one or more nodes in a secondary network associated with the sidechain.

7. The method of claim 6, further comprising:
replacing, by the processing device of the blockchain node, the expected data value in the data pair with the new data value.

8. The method of claim 1, wherein the data pair is stored in a smart contract included in a transaction value included in a blockchain associated with the blockchain network.

9. A system for two factor authentication for a blockchain transaction, comprising:
a memory of a blockchain node configured to store a data pair including at least a public key of a first cryptographic key pair and an expected data value;
a receiver of the blockchain node configured to receive a transaction request, wherein the transaction request includes at least a first digital signature, one or more input addresses, one or more output addresses, and at least one transaction amount;
a processing device of the blockchain node configured to
identify a processed transaction in a sidechain including at least a destination address and a transaction data value, wherein the destination address is generated using the public key of the first cryptographic key pair,
perform a first authentication, wherein the first authentication includes at least validating the first digital signature using the public key of the first cryptographic key pair, and
perform a second authentication, wherein the second authentication includes at least validating the transaction data value using the expected data value; and
a transmitter of the blockchain node configured to transmit the received transaction request to a plurality of other nodes in a blockchain network that includes the blockchain node.

10. The system of claim 9, wherein
the processing device of the blockchain node is further configured to generate a new block comprised of a new block header and a plurality of transaction values,
at least one of the plurality of transaction values includes the transaction request, and
transmitting the received transaction request includes transmitting the generated new block.

11. The system of claim 10, wherein
the memory of the blockchain node is further configured to store a blockchain comprised of a plurality of blocks, wherein each block is comprised of a block header and one or more transaction values,
the processing device of the blockchain node is further configured to generate the new block header, wherein the new block header includes at least a timestamp, a first hash value generated from the plurality of transaction values, and a second hash value generated from the block header in a most recent block of the plurality of blocks, and
the new block header is generated before generating the new block.

12. The system of claim 9, wherein
the expected data value is a digital token, and
validating the transaction data value using the expected data value includes checking the transaction data value as being the same digital token as the expected data value.

13. The system of claim 9, wherein
the expected data value is a public key of a second cryptographic key pair,
the transaction data value is a second digital signature, and
validating the transaction data value using the expected data value includes validating the second digital signature using the public key of the second cryptographic key pair.

14. The system of claim 9, wherein
the processing device of the blockchain node is further configured to identify a new data value, and
the transmitter of the blockchain node is further configured to transmit at least the new data value and a recipient address generated using a public key of a second cryptographic key pair to one or more nodes in a secondary network associated with the sidechain.

15. The system of claim 14, wherein the processing device of the blockchain node is further configured to replace the expected data value in the data pair with the new data value.

16. The system of claim 9, wherein the data pair is stored in a smart contract included in a transaction value included in a blockchain associated with the blockchain network.

* * * * *